Sept. 21, 1926.  
E. D. FERREIRA  
TRACTION BAND  
Filed Dec. 31, 1923

1,600,871

Inventor  
E. D. Ferreira,  
By Clarence A. O'Brien  
Attorney

Patented Sept. 21, 1926.

1,600,871

UNITED STATES PATENT OFFICE.

EMANUEL D. FERREIRA, OF HONOLULU, TERRITORY OF HAWAII.

TRACTION BAND.

Application filed December 31, 1923. Serial No. 683,831.

This invention relates to what may be conveniently termed as a traction band for lawn mower wheels, the same having more specific reference to a structure which is capable of being applied to the periphery of conventional wheels of this class, whereby to obviate alterations of the original wheel structure.

My primary aim is to generally improve upon attachment of this class by providing one of comparative simplicity and durability which is such as to permit it to be easily applied to the lawn mower wheels, one which may be easily machined and which is such in construction that it effectively accomplishes the purpose for which it was designed.

An equally important object is to provide a simple and inexpensive band with means for detachably mounting it upon the periphery of a lawn mower wheel. This band is provided with a multiplicity of anti-slipping members for the purpose of insuring a positive traction regardless of irregularities and inclines in the surface of the lawn to be traversed.

Other features and advantages of the invention will become apparent from the following description and drawings.

In the accompanying drawings forming a part of this application and in which like numerals are employed to designate like parts throughout the same:

Generically speaking, the invention comprises a band which is adapted for application to the periphery of a lawn mower wheel, this band being transversely split to facilitate application and removal, and to render it adjustable to different diameters of wheels. The free ends of the band are directed angularly outward and are apertured for passage of appropriate fastening means to maintain the band in operative positions and anti-slipping lugs are permanently connected to the band and these are arranged in circumferential alignment to provide what may be said to be two transversely spaced rows of lugs. It will be noted that the rows are disposed on opposite sides of the longitudinal center of the band and the aforesaid ends are disposed in alignment with said longitudinal center, and are fashioned to provide additional and anti-slipping lugs.

Figure 1:
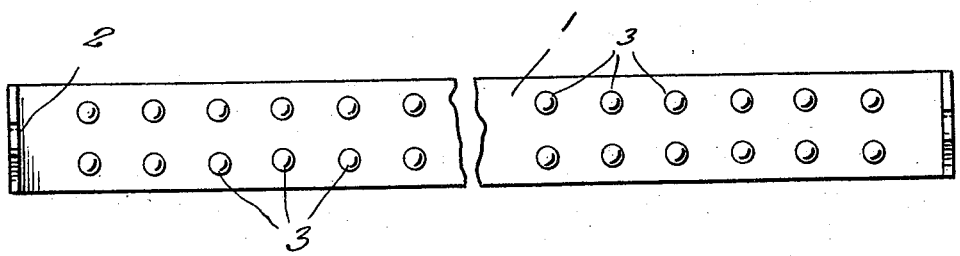
Figure 1 is a top plan view of a traction band constructed in accordance with this invention showing the same removed from the lawn mower wheel.
Figure 2:
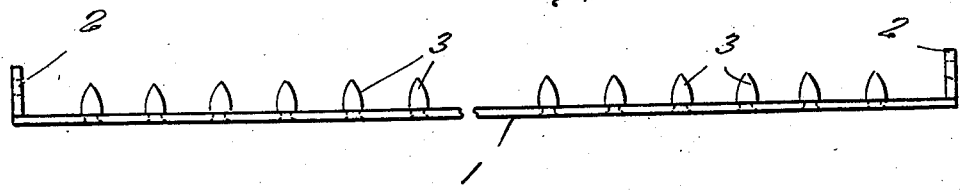
Figure 2 is a side view of the structure shown in Figure 1.
Figure 5:
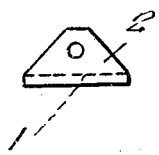
Figure 5 is an end view of either one of the embodiments.

Considering Figures 1 and 2, it will be seen that the reference character 1 designates a band of appropriate thickness and width, preferably of more or less pliable metal so that it can be bent around the periphery of the wheel to which it is adapted to be attached. The opposite ends of the band are directed angularly outward or at right angles to the body portion to provide ears 2. From Figure 5 it will be seen that the ears, in end elevation, are of truncated pyramidal form. The ears are apertured for passage of an appropriate connecting bolt or other suitable fastening elements (not shown). The lugs are here represented by the reference characters 3, and as stated, these are arranged in two longitudinal rows, being disposed in circumferentially spaced relation. Each row is arranged on one side of the longitudinal center of the band. This provides the truncated end portions of the aforesaid ears 2 for disposition in longitudinal alignment with the center of the band, and thus permit them to act as additional traction lugs as stated. It will be noted that the lugs 3 are in the form of pointed spurs and that they are permanently welded or otherwise attached to the band.

Figure 3:
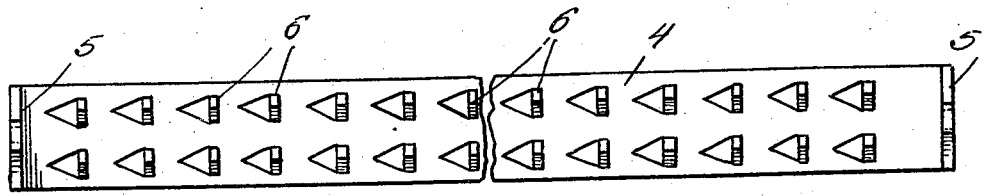
Figure 3 is a top plan view of a different embodiment of the invention.
Figure 4:
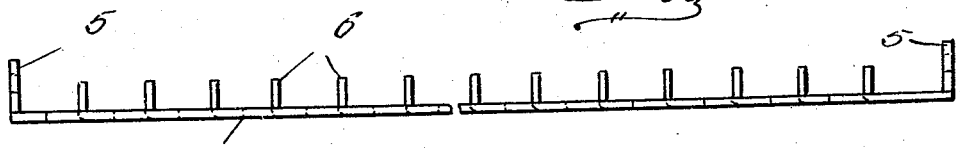
Fig. 4 is a side or edge elevational view of the embodiment shown in Figure 3.

Confining now to Figures 3 and 4, it will be seen that the band is represented by the reference character 4, the apertured end ears by the reference characters 5 and the anti-slipping or traction lugs by the reference characters 6. In this form of the invention, the lugs are simply struck up from the metal of the band, and are substantially triangular in end elevation, thus providing pointed spurs to effectively engage the surface traversed to provide effective traction. In this form of the invention also the lugs 6 are arranged in circumferential or longitudinal rows on opposite sides of the longitudinal center with the end ears 5 in alignment with the longitudinal center.

From the foregoing description and drawings, it will be seen that I have evolved and produced a novel traction band of simple and inexpensive construction for detachable application to the periphery of a lawn mower wheel, whereby the lawn mower may be operated more successfully on inclined terraces, and to insure effective severing of blades of grass under all conditions in order to obviate the necessity of going over and over the same plot of grass. The construction and features favoring my invention will no doubt be made apparent from the description and drawings. Therefore, a more lengthy description is thought unnecessary.

Minor changes coming within the field of the invention claimed may be resorted to if desired.

I claim:

As a new article of manufacture, a removable traction band for application to the periphery of a lawn mower wheel, said band being transversely split and thus adapted for adjustable application to the wheel, the free ends of the band being directed angularly outward and apertured for passage of fastening means employed to maintain the band in operative position, and anti-slipping lugs permanently connected to said band and arranged in circumferential alinement to provide two transversely spaced rows, said rows being disposed on opposite sides to the longitudinal center of the band, and the aforesaid ends being disposed in alinement with said longitudinal center and being fashioned to provide additional anti-slipping means.

EMANUEL D. FERREIRA.